(12) United States Patent
Chang (10) Patent No.: US 6,631,539 B1
(45) Date of Patent: Oct. 14, 2003

(54) HOOK DEVICE

(76) Inventor: Vincent Chang, 58, Ma Yuan West St., Taichung (TW)

( * ) Notice: Subject to any disclaimer, the term of this patent is extended or adjusted under 35 U.S.C. 154(b) by 0 days.

(21) Appl. No.: 10/223,933

(22) Filed: Aug. 16, 2002

(51) Int. Cl.[7] ............................ A44B 13/02; B66C 1/36; F16B 45/04
(52) U.S. Cl. .................. 24/599.4; 24/265 H; 24/592.1; 24/600.9; 294/82.19; 294/82.2; 410/105; 410/110
(58) Field of Search ............................ 24/599.4, 599.5, 24/599.6, 599.1, 599.2, 601.5, 600.9, 68 CD, 265 H; 410/105, 110; 294/82.19, 82.2, 82.33; 43/43.2; 59/93

(56) References Cited

U.S. PATENT DOCUMENTS

| | | | | |
|---|---|---|---|---|
| 1,007,213 A | * | 10/1911 | Lau | 24/599.4 |
| 5,832,572 A | * | 11/1998 | Norrby | 24/600.9 |
| 6,081,975 A | * | 7/2000 | Norrby | 294/82.2 |
| 6,209,179 B1 | * | 4/2001 | Shou-Mao | 24/600.1 |
| 6,427,296 B1 | * | 8/2002 | Chang | 24/600.9 |
| 6,519,818 B1 | * | 2/2003 | Chang | 24/265 H |

* cited by examiner

Primary Examiner—Victor Sakran (57) ABSTRACT

A hook device has a main body having a pair of arm portions, a connection portion and a hook portion, a block mount disposed on the main body, a fastener seat disposed on the block mount, and a torsion spring. The block mount has a generally U-shaped middle portion, a pair of side collars connected to the generally U-shaped middle portion, and a positioning through hole. The fastener seat has a pivot pin support portion, a through aperture, a proximal end, and a distal end. Each side collar surrounds one of the arm portions of the main body. The torsion spring is disposed in the fastener seat. The pivot pin support portion of the fastener seat is inserted in the generally U-shaped middle portion of the block mount. A pivot pin fastens the block mount, the fastener seat, and the torsion spring together.

6 Claims, 11 Drawing Sheets

United States Patent 6,631,539 B1

HOOK DEVICE

BACKGROUND OF THE INVENTION

The present invention relates to a hook device. More particularly, the present invention relates to a hook device which can hook goods on a freight car safely.

A conventional safety hook is often soldered with a safety buckle. However, the conventional safety hook and the safety buckle are weakened by a heat treatment. Thus the conventional safety hook and the safety buckle will be broken easily while carrying a heavy article.

SUMMARY OF THE INVENTION

An object of the present invention is to provide a hook device which can hook a heavy article safely.

Another object of the present invention is to provide a fastener seat which engages with a hook portion of a main body stably.

Accordingly, a hook device comprises a main body having a pair of arm portions, a connection portion and a hook portion, a block mount disposed on the main body, a fastener seat disposed on the block mount, and a torsion spring. The block mount has a generally U-shaped middle portion, a pair of side collars connected to the generally U-shaped middle portion, and a positioning through hole. The fastener seat has a pivot pin support portion, a through aperture to match the positioning through hole of the block mount, a proximal end, and a distal end. Each of the side collars surrounds one of the arm portions of the main body. The torsion spring is disposed in the fastener seat. The pivot pin support portion of the fastener seat is inserted in the generally U-shaped middle portion of the block mount. A pivot pin passes through the positioning through hole of the block mount, the through aperture of the fastener seat, and the torsion spring. The distal end of the fastener seat engages with the hook portion of the main body.

In accordance with a first preferred embodiment of, the present invention, a hook device comprises a main body having a pair of arm portions, a connection portion and a hook portion, a block mount disposed on the main body, a fastener seat disposed on the block mount, and a torsion spring. The block mount has a generally U-shaped middle portion, a pair of side collars connected to the generally U-shaped middle portion, and a positioning through hole. The fastener seat has a pivot pin support portion, a through aperture to match the positioning through hole of the block mount, a proximal end, and a distal end. A distal end plate engages with the distal end of the fastener seat. Each of the side collars surrounds one of the arm portions of the main body. The torsion spring is disposed in the fastener seat. The pivot pin support portion of the fastener seat is inserted in the generally U-shaped middle portion of the block mount. A pivot pin passes through the positioning through hole of the block mount, the through aperture of the fastener seat, and the torsion spring. The distal end plate of the fastener seat engages with the hook portion of the main body.

In accordance with a second preferred embodiment of the present invention, a hook device comprises a main body having a pair of arm portions, a connection portion and a hook portion, a block mount disposed on the main body, a fastener seat disposed on the block mount, and a torsion spring. The block mount has a generally U-shaped middle portion, a pair of side collars connected to the generally U-shaped middle portion, and a positioning through hole. The fastener seat has a pivot pin support portion, a through aperture to match the positioning through hole of the block mount, a proximal end, and a serrated distal end. Each of the side collars surrounds one of the arm portions of the main body. The torsion spring is disposed in the fastener seat. The pivot pin support portion of the fastener seat is inserted in the generally U-shaped middle portion of the block mount. A pivot pin passes through the positioning through hole of the block mount, the through aperture of the fastener seat, and the torsion spring.

DETAILED DESCRIPTION OF THE INVENTION

Referring to FIGS. 1 to 4, a first hook device comprises a main body 10 having a pair of arm portions 100, a connection portion 11 and a hook portion 12, a block mount 20 disposed on the main body 10, a fastener seat 30 disposed on the block mount 20, and a torsion spring 40.

The block mount 20 has a generally U-shaped middle portion 21, a pair of side collars 23 connected to the generally U-shaped middle portion 21, and a positioning through hole 22.

The fastener seat 30 has a pivot pin support portion 31, a through aperture 32 to match the positioning through hole 22 of the block mount 20, a proximal end 35, and a distal end. A distal end plate 33 engages with the distal end of the fastener seat 30.

Each of the side collars 23 surrounds one of the arm portions 100 of the main body 10.

The torsion spring 40 is disposed in the fastener seat 30.

The pivot pin support portion 31 of the fastener seat 30 is inserted in the generally U-shaped middle portion 21 of the block mount 20.

A pivot pin 50 passes through the positioning through hole 22 of the block mount 20, the through aperture 32 of the fastener seat 30, and the torsion spring 40.

The distal end plate 33 engages with the hook portion 12 of the main body 10.

Figure 1:
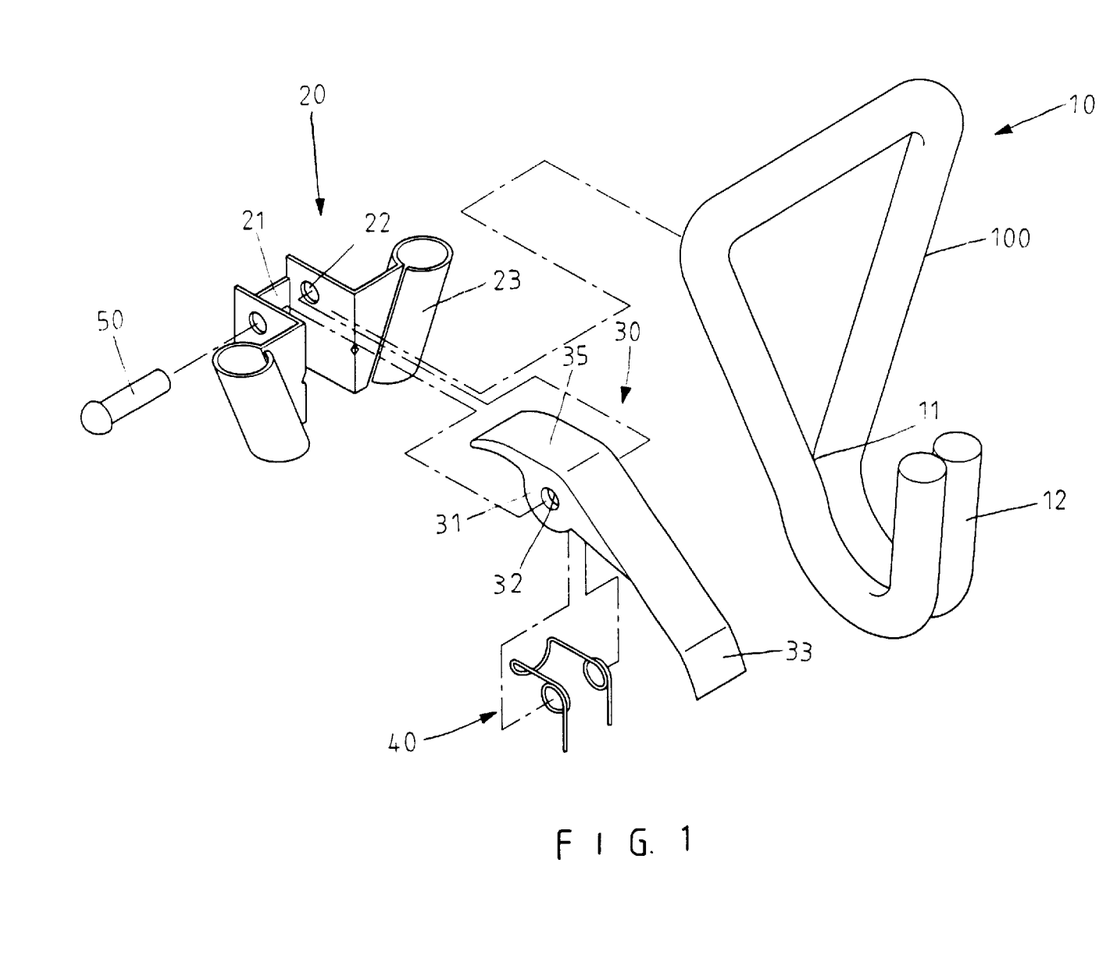
FIG. 1 is a perspective exploded view of a hook device of a first preferred embodiment in accordance with the present invention.
Figure 2:
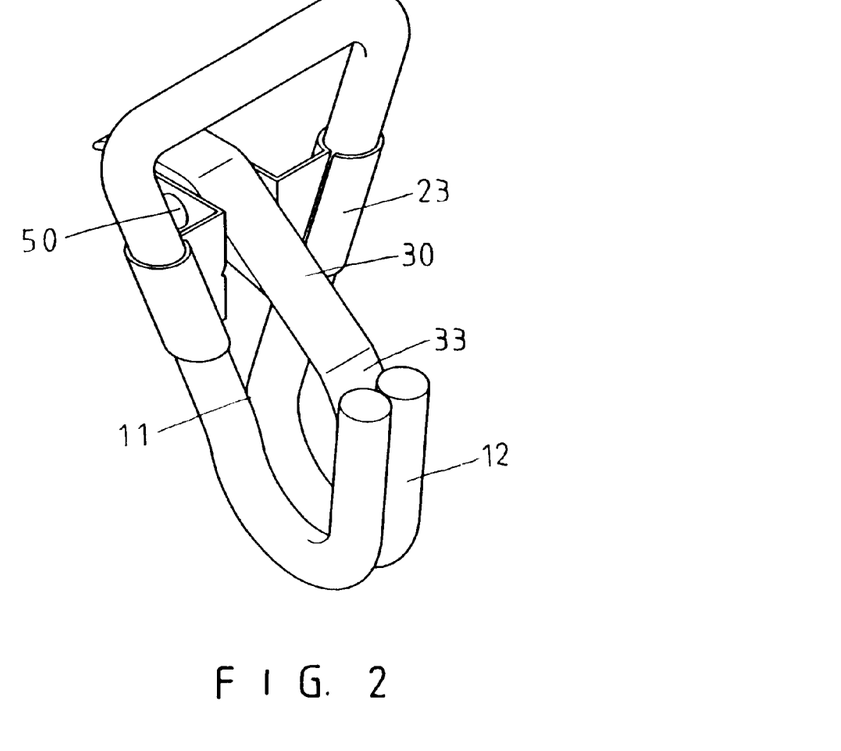
FIG. 2 is a perspective assembly view of a hook device of a first preferred embodiment in accordance with the present invention.
Figure 2A:
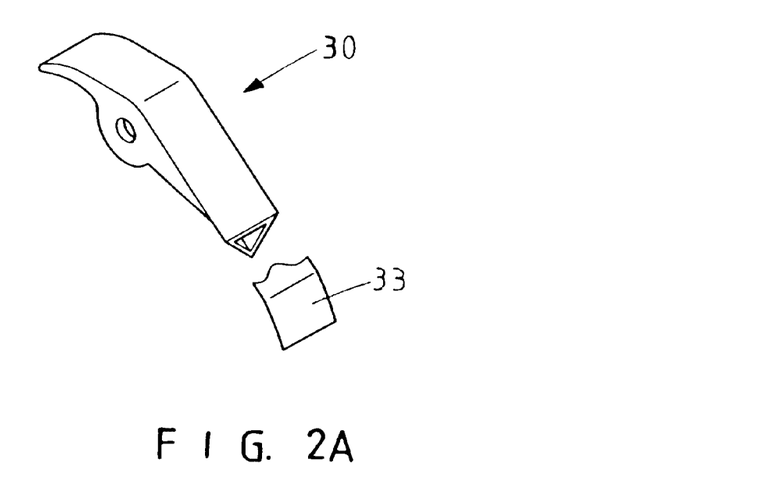
FIG. 2A is a perspective exploded view of a fastener seat of a first preferred embodiment in accordance with the present invention.
Figures 3, 3A:
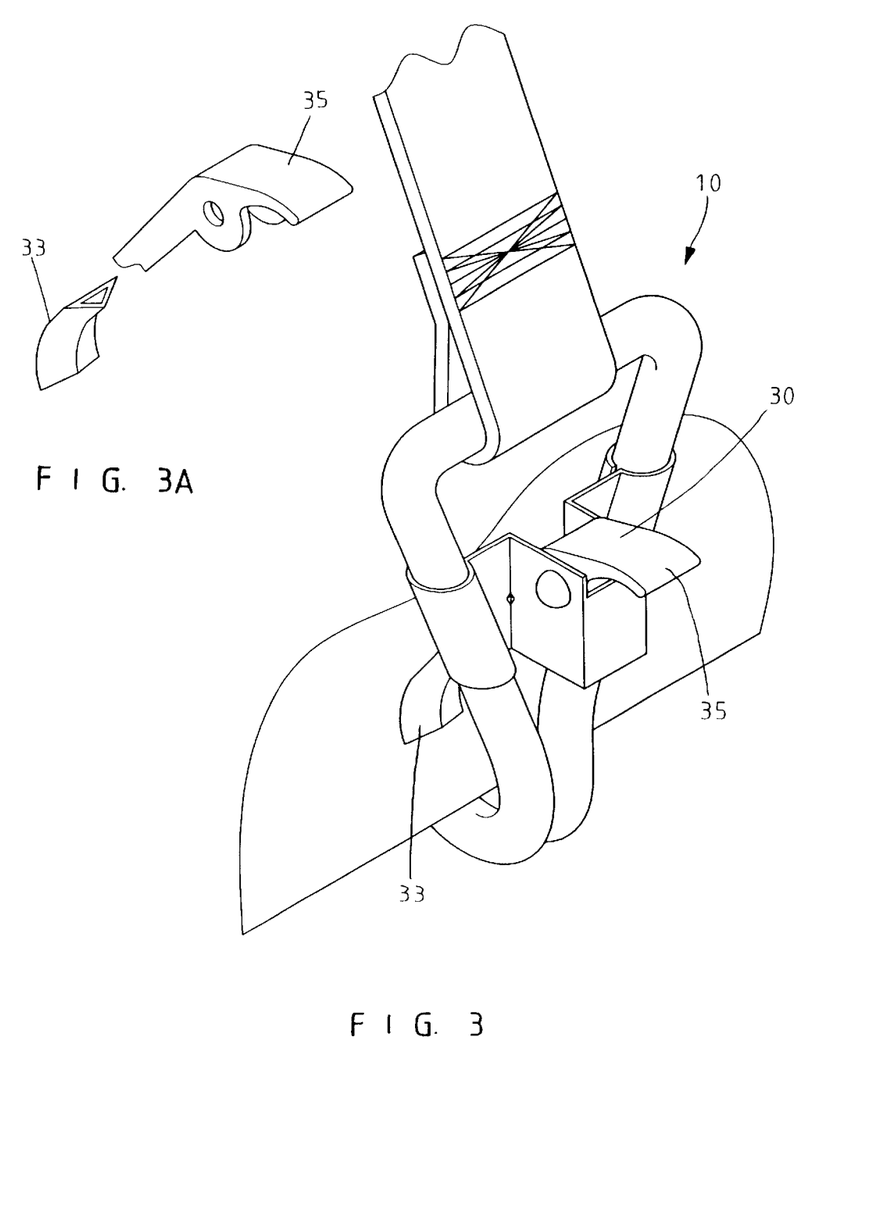
FIG. 3 is a partially perspective assembly view of a hook device of a first preferred embodiment in accordance with the present invention.
FIG. 3A is another perspective exploded view of a fastener seat of a first preferred embodiment in accordance with the present invention.
Figure 4:
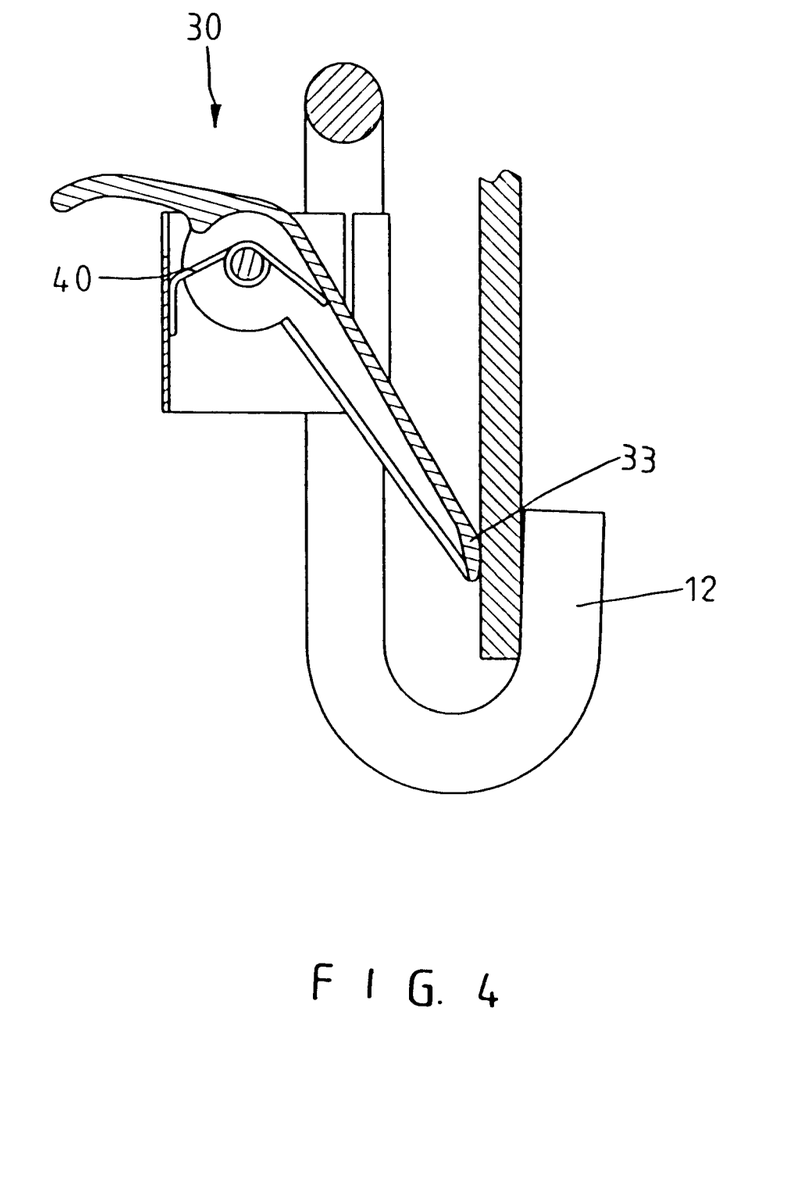
FIG. 4 is a partially sectional view of a hook device of a first preferred embodiment in accordance with the present invention.
Figure 5:
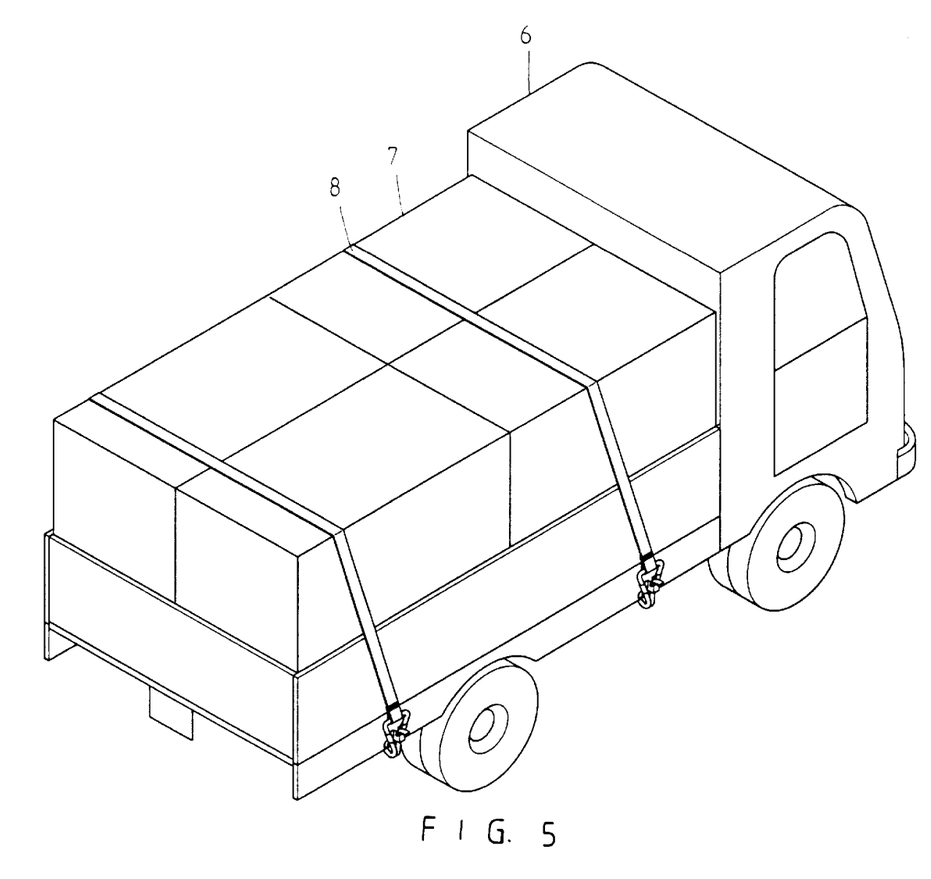
FIG. 5 is a schematic view illustrating a first application of a hook device of a first preferred embodiment in accordance with the present invention.

Referring to FIG. 5, goods 7 are disposed on a freight car 6. A band 8 encloses the goods 7. The band 8 is connected to the first hook device.

Figure 6:
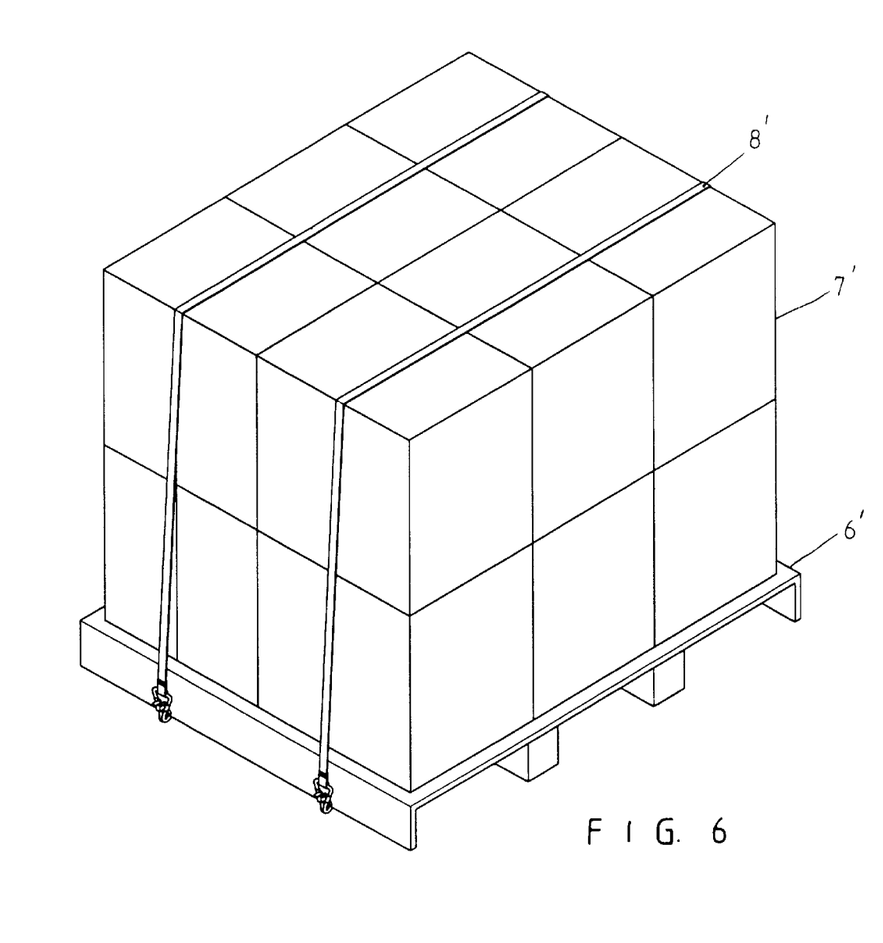
FIG. 6 is a schematic view illustrating a second application of a hook device of a first preferred embodiment in accordance with the present invention.

Referring to FIG. 6, goods 7' are disposed on a plate frame 6'. A band 8' encloses the goods 7'. The band 8' is connected to the first hook device.

Figure 7:
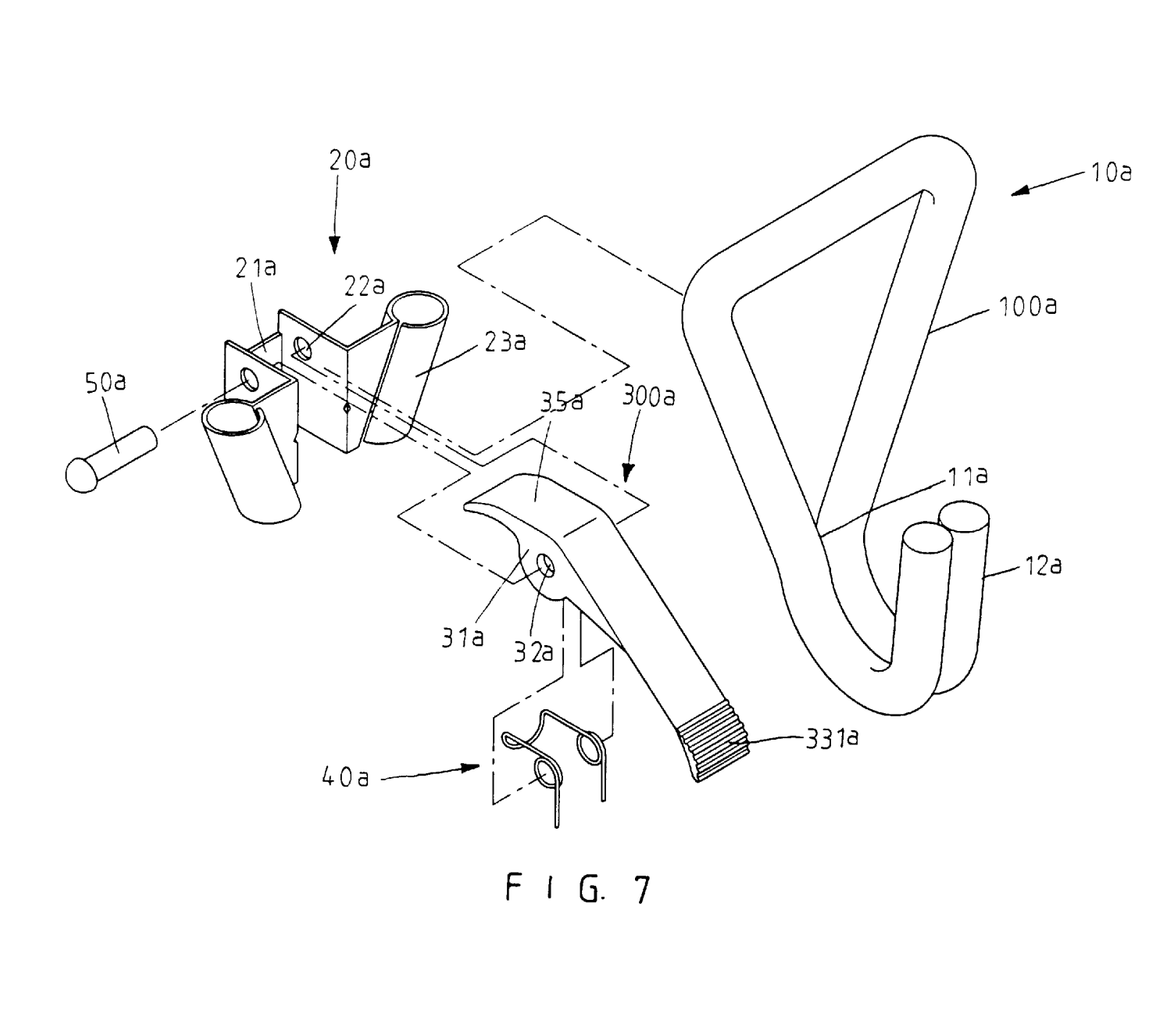
FIG. 7 is a perspective exploded view of a hook device of a second preferred embodiment in accordance with the present invention.

Referring to FIG. 7, a second hook device comprises a main body 10a having a pair of arm portions 100a, a connection portion 11a and a hook portion 12a, a block mount 20a disposed on the main body 10a, a fastener seat 300a disposed on the block mount 20a, and a torsion spring 40a.

The block mount 20a has a generally U-shaped middle portion 21a, a pair of side collars 23a connected to the generally U-shaped middle portion 21a, and a positioning through hole 22a.

The fastener seat 300a has a pivot pin support portion 31a, a through aperture 32a to match the positioning through hole 22a of the block mount 20a, a proximal end 35a, and a serrated distal end 331a.

Each of the side collars 23a surrounds one of the arm portions 100a of the main body 10a.

The torsion spring 40a is disposed in the fastener seat 300a.

The pivot pin support portion 31a of the fastener seat 300a is inserted in the generally U-shaped middle portion 21a of the block mount 20a.

A pivot pin 50a passes through the positioning through hole 22a of the block mount 20a, the through aperture 32a of the fastener seat 300a, and the torsion spring 40a.

Figure 8:
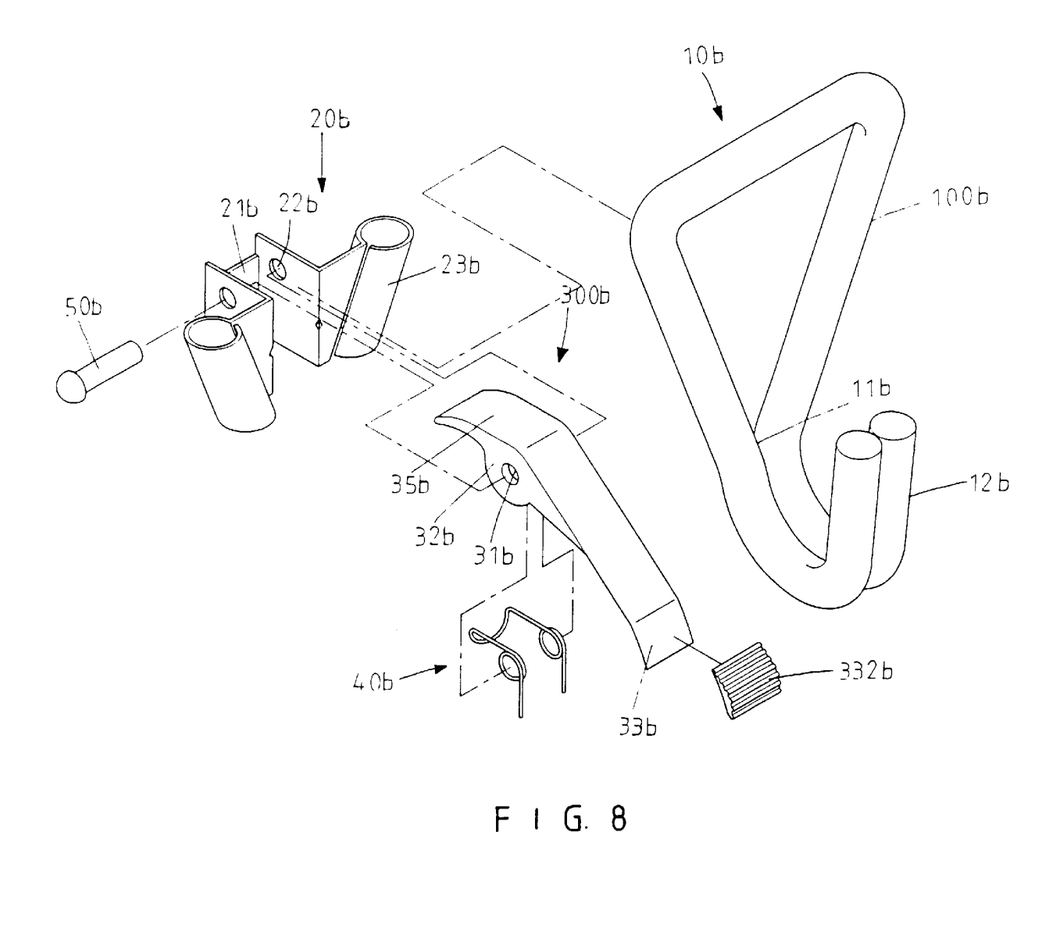
FIG. 8 is a perspective exploded view of a hook device of a third preferred embodiment in accordance with the present invention.

Referring to FIG. 8, a third hook device comprises a main body 10b having a pair of arm portions 100b, a connection portion 11b and a hook portion 12b, a block mount 20b disposed on the main body 10b, a fastener seat 300b disposed on the block mount 20b, and a torsion spring 40b.

The block mount 20b has a generally U-shaped middle portion 21b, a pair of side collars 23b connected to the generally U-shaped middle portion 21b, and a positioning through hole 22b.

The fastener seat 300b has a pivot pin support portion 31b, a through aperture 32b to match the positioning through hole 22b of the block mount 20b, a proximal end 35b, and a distal end 33b. A serrated block 332b is disposed on the distal end 33b of the fastener seat 300b.

Each of the side collars 23b surrounds one of the arm portions 100b of the main body 10b.

The torsion spring 40b is disposed in the fastener seat 300b.

The pivot pin support portion 31b of the fastener seat 300b is inserted in the generally U-shaped middle portion 21b of the block mount 20b.

A pivot pin 50b passes through the positioning through hole 22b of the block mount 20b, the through aperture 32b of the fastener seat 300b, and the torsion spring 40b.

Figure 9:
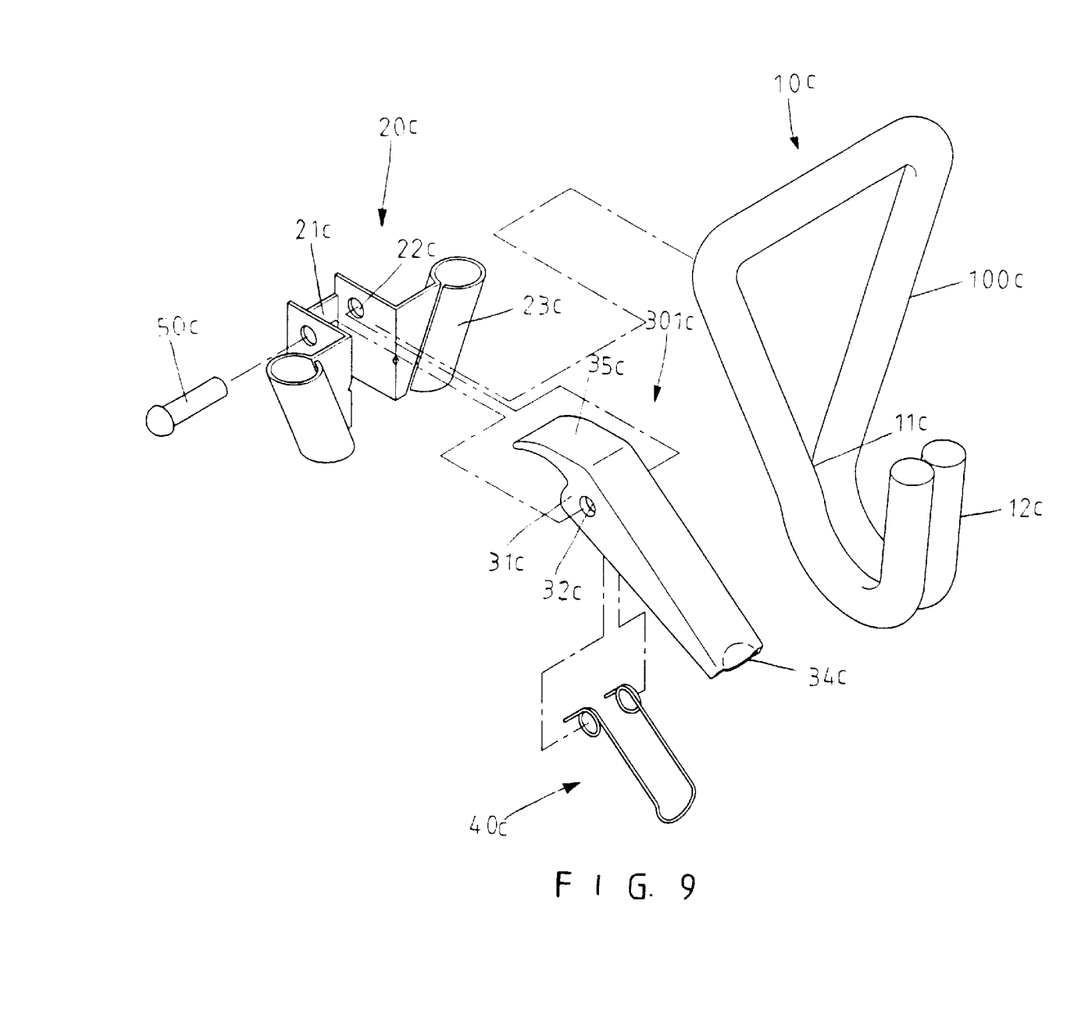
FIG. 9 is a perspective exploded view of a hook device of a fourth preferred embodiment in accordance with the present invention.

Referring to FIG. 9, a fourth hook device comprises a main body 10c having a pair of arm portions 100c, a connection portion 11c and a hook portion 12c, a block mount 20c disposed on the main body 10c, a fastener seat 301c disposed on the block mount 20c, and a torsion spring 40c.

The block mount 20c has a generally U-shaped middle portion 21c, a pair of side collars 23c connected to the generally U-shaped middle portion 21c, and a positioning through hole 22c.

The fastener seat 301c has a pivot pin support portion 31c, a through aperture 32c to match the positioning through hole 22c of the block mount 20c, a proximal end 35c, and a distal end. An end plate 34c is inserted in the distal end of the fastener seat 301c.

Each of the side collars 23c surrounds one of the arm portions 100c of the main body 10c.

The torsion spring 40c is disposed in the fastener seat 301c.

The pivot pin support portion 31c of the fastener seat 301c is inserted in the generally U-shaped middle portion 21c of the block mount 20c.

A pivot pin 50c passes through the positioning through hole 22c of the block mount 20c, the through aperture 32c of the fastener seat 301c, and the torsion spring 40c.

Figure 10:
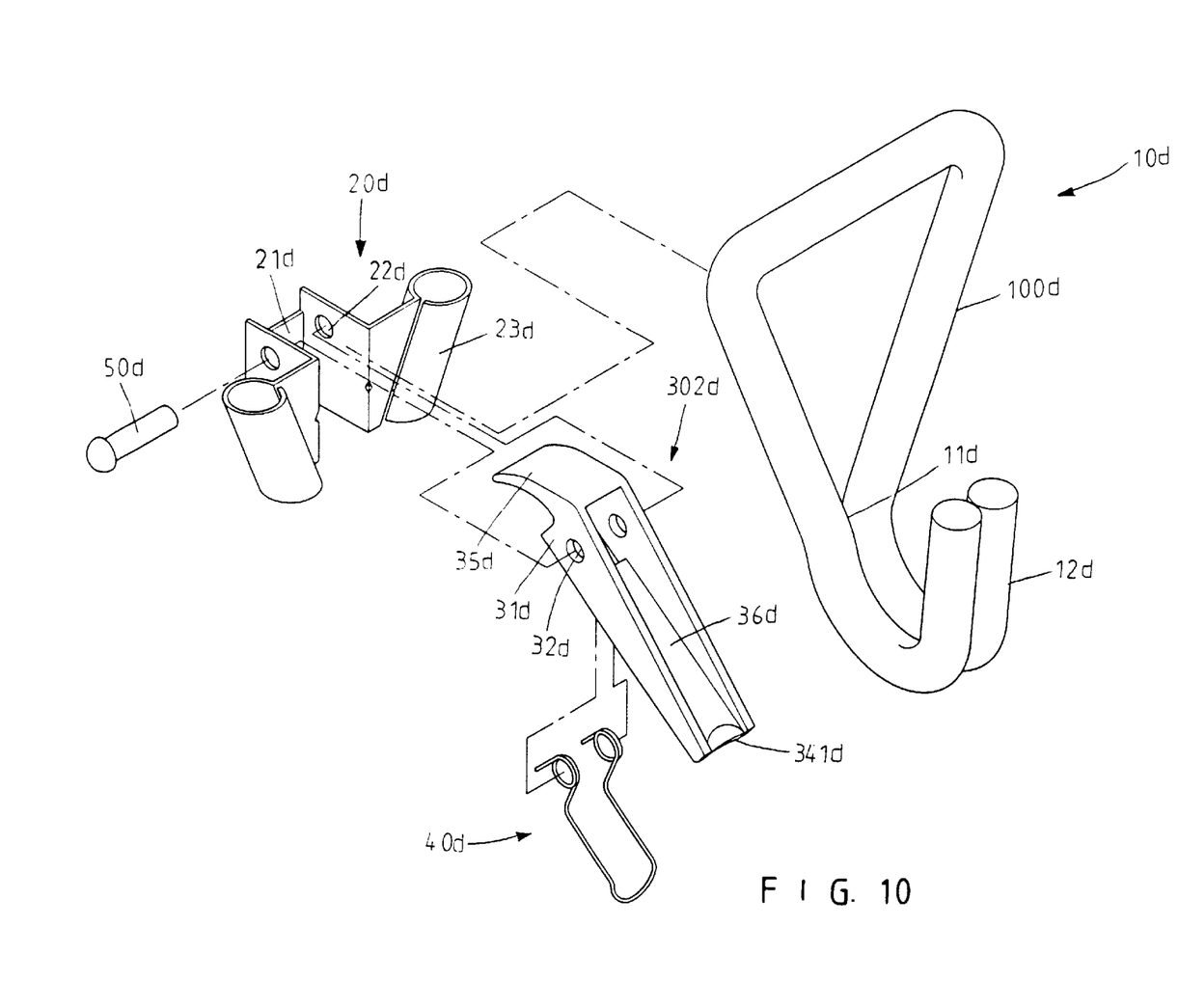
FIG. 10 is a perspective exploded view of a hook device of a fifth preferred embodiment in accordance with the present invention.

Referring to FIG. 10, a fifth hook device comprises a main body 10 having a pair of arm portions 100, a connection portion 11 and a hook portion 12, a block mount 20 disposed on the main body 10, a fastener seat 30 disposed on the block mount 20, and a torsion spring 40.

The block mount 20 has a generally U-shaped middle portion 21, a pair of side collars 23 connected to the generally U-shaped middle portion 21, and a positioning through hole 22.

The fastener seat 302d has a pivot pin support portion 31d, a through aperture 32d to match the positioning through hole 22d of the block mount 20d, a proximal end 35d, a groove 36d, and a distal end. An end plate 341d is inserted in the distal end of the fastener seat 302d.

Each of the side collars 23d surrounds one of the arm portions 100d of the main body 10d.

The torsion spring 40d is disposed in the fastener seat 302d.

The pivot pin support portion 31d of the fastener seat 302d is inserted in the generally U-shaped middle portion 21d of the block mount 20d.

A pivot pin 50d passes through the positioning through hole 22d of the block mount 20d, the through aperture 32d of the fastener seat 302d, and the torsion spring 40d.

Figure 11:
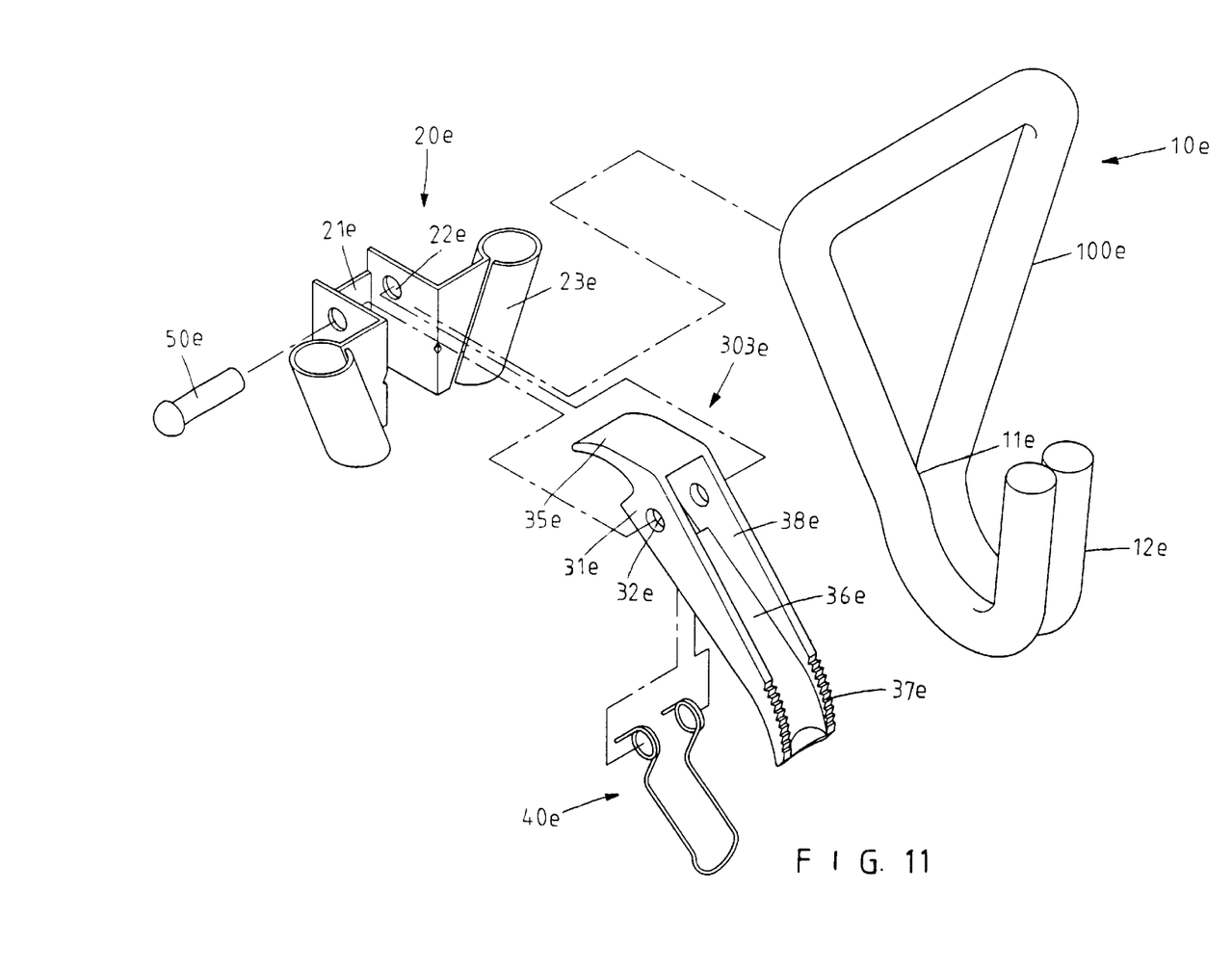
FIG. 11 is a perspective exploded view of a hook device of a sixth preferred embodiment in accordance with the present invention.

Referring to FIG. 11, a sixth hook device comprises a main body 10e having a pair of arm portions 10e, a connection portion 11e and a hook portion 12e, a block mount 20e disposed on the main body 10e, a fastener seat 303e disposed on the block mount 20e, and a torsion spring 40e.

The block mount 20e has a generally U-shaped middle portion 21e, a pair of side collars 23e connected to the generally U-shaped middle portion 21e, and a positioning through hole 22e.

The fastener seat 303e has a pivot pin support portion 31e, a through aperture 32e to match the positioning through hole 22e of the block mount 20e, a proximal end 35e, a groove 36e, two side walls 38e, and a serrated end portion 37e.

Each of the side collars 23e surrounds one of the arm portions 100e of the main body 10e.

The torsion spring 40e is disposed in the fastener seat 303e.

The pivot pin support portion 31e of the fastener seat 303e is inserted in the generally U-shaped middle portion 21e of the block mount 20e.

A pivot pin 50e passes through the positioning through hole 22e of the block mount 20e, the through aperture 32e of the fastener seat 303e, and the torsion spring 40e.

The present invention is not limited to the above embodiments but various modifications thereof may be made. Furthermore, various changes in form and detail may be made without departing from the scope of the present invention.

I claim:

1. A hook device comprises:
   a main body having a pair of arm portions, a connection portion and a hook portion, a block mount disposed on the main body, a fastener seat disposed on the block mount, and a torsion spring,
   the block mount having a generally U-shaped middle portion, a pair of side collars connected to the generally U-shaped middle portion, and a positioning through hole,
   the fastener seat having a pivot pin support portion, a through aperture to match the positioning through hole of the block mount, a proximal end, and a distal end,
   each of the side collars surrounding one of the arm portions of the main body,
   the torsion spring disposed in the fastener seat,
   the pivot pin support portion of the fastener seat inserted in the generally U-shaped middle portion of the block mount,
   a pivot pin passing through the positioning through hole of the block mount, the through aperture of the fastener seat, and the torsion spring, and
   the distal end of the fastener seat engaging with the hook portion of the main body.

2. The hook device as claimed in claim 1, wherein the fastener seat has a distal end plate engaging with the distal end of the fastener seat.

3. The hook device as claimed in claim 1, wherein the fastener seat has a serrated distal end.

4. The hook device as claimed in claim 1, wherein a serrated block is disposed on the distal end of the fastener seat.

5. The hook device as claimed in claim 1, wherein an end plate is inserted in the distal end of the fastener seat.

6. The hook device as claimed in claim 1, wherein the fastener seat has a serrated end portion.

* * * * *